Patented May 4, 1954

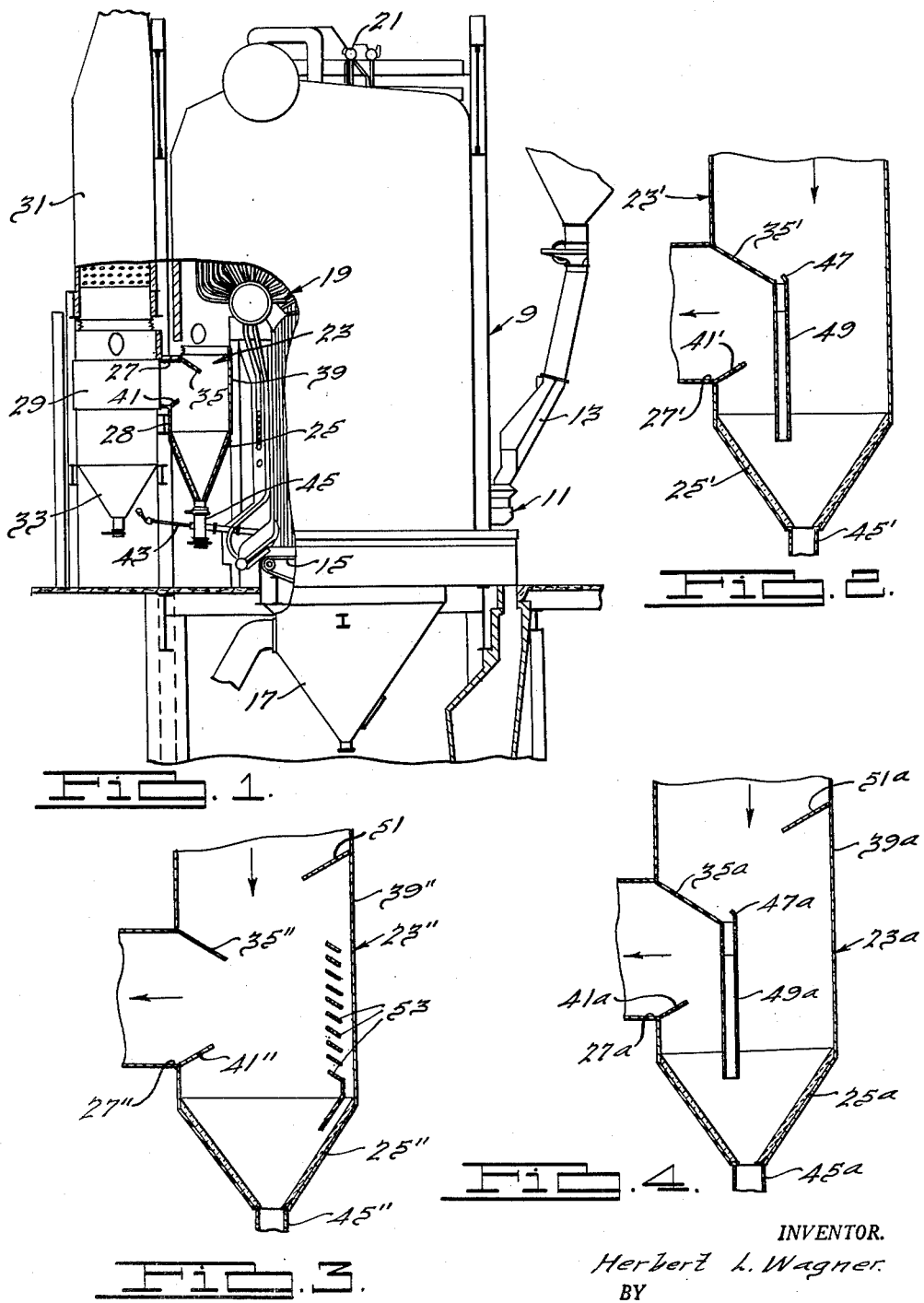

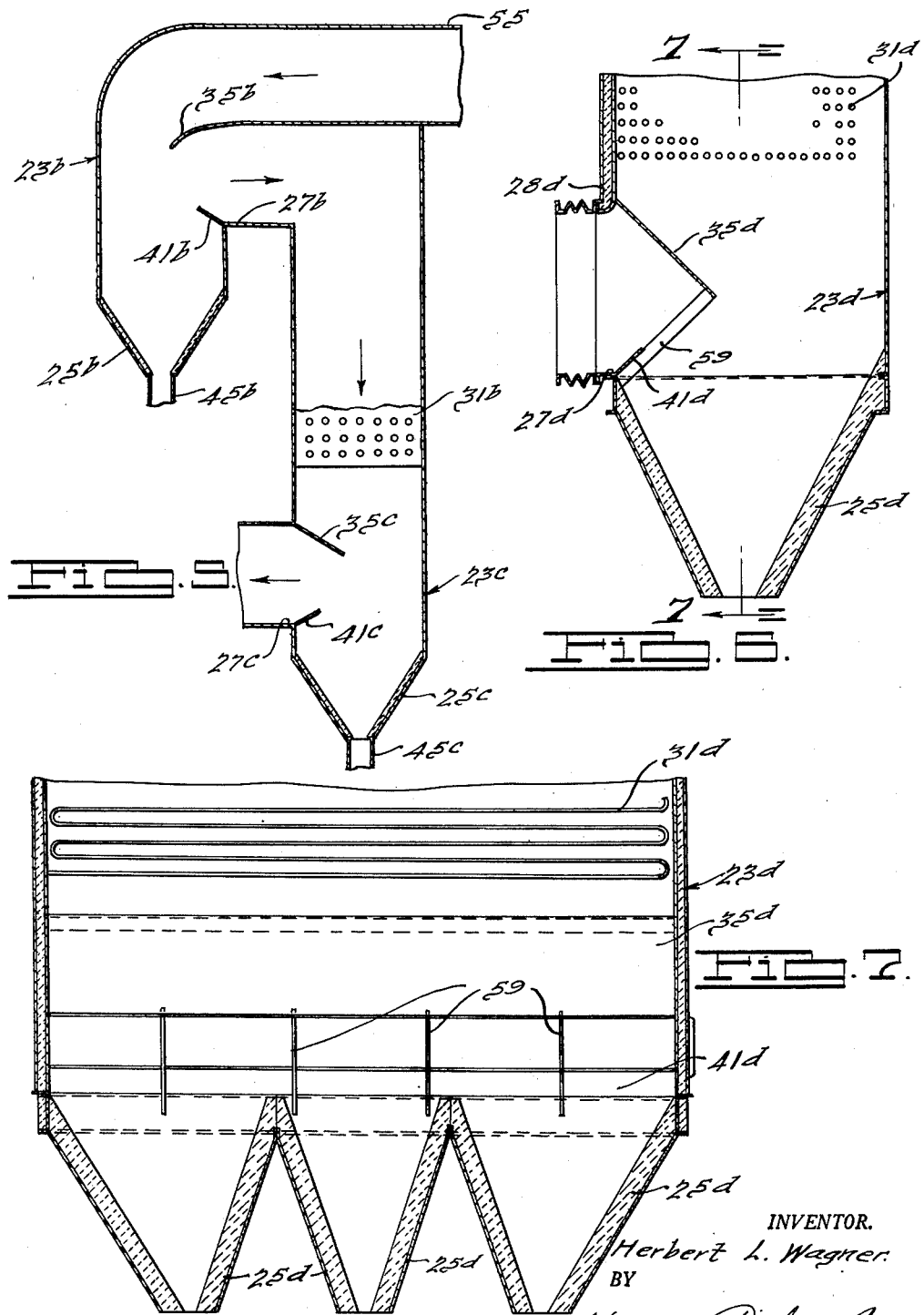

2,677,437

UNITED STATES PATENT OFFICE 2,677,437

HEATING SYSTEM AND LOW DRAFT LOSS DUST COLLECTOR FOR USE THEREIN

Herbert L. Wagner, Detroit, Mich., assignor to Detroit Stoker Company, Detroit, Mich., a corporation of Michigan Application August 22, 1950, Serial No. 180,795

4 Claims. (Cl. 183—75)

This invention relates generally to apparatus for separating or removing solid particles from gases, and more particularly to a low draft loss dust collector in a coal heat generating system, for removing unburned combustible particles from the gases so that the particles may be returned to the fuel bed for reburning.

In industrial power generating systems water is often heated to steam, for the operation of turbines and the like, by the circulation of heated gases which rise from a coal bed or the like and circulate around a boiler. These gases contain dust or particles, some of which may be high in carbon and reusable, and the particles are removed from the gases before they pass out into the atmosphere, or the like. In the past, a dust collector has been employed for this purpose, and in order to efficiently remove all of the particles the collector has been of the type which utilizes centrifugal force to separate the solid particles from the gases, and as a result there is a large draft loss in the system and a large fan, or the like, must be employed to pull the gases through the dust collector and system, which necessitates relatively large power consumption.

The solid particles so collected in the dust collector are either discarded in the ash handling system or are all recirculated and returned to the fuel bed. As the large particles have a high carbon content and can be reburned in the furnace, they are wasted if they are discarded with the noncombustible particles in the gases. The small or fine particles are, however, primarily ash, and if they are recirculated the ash concentration in the system becomes high and leads to unsatisfactory results. Therefore, a more efficient system would be provided if the large particles, high in combustible material, were separated from the fine particles, low in combustible material, so that the large particles could be reburned, without at the same time requiring a great deal more power to pull the gases through the system.

It is, therefore, an object of this invention to provide apparatus for separating or removing solid particles from the gases, which apparatus is so designed and constructed that the larger particles, which are high in carbon content, are separated from the gases in a low draft loss dust collector and are subsequently returned to the coal bed for reburning, while the smaller particles, high in non-combustible material, are separated from the gases in a second dust collector, from which they can be discarded.

It is a still further object of this invention to provide apparatus of the aforementioned type, in which the pressure drop or draft loss in the large particle dust collector is comparatively small so that the use of an excessive amount of power in order to pull the gases through the dust collectors is not necessary.

It is a still further object of this invention to provide in a low draft loss dust collector of the aforementioned type, a novel arrangement for causing the gases and gas borne particles to flow in a predetermined path, such that the particles can and will be removed from the gases and deposited in a hopper or the like for subsequent reburning.

It is a still further object of this invention to provide apparatus of the aforementioned type which is relatively inexpensive to manufacture, simple in construction and efficient in operation.

These and other objects of this invention will become apparent from the following detailed description, taken in conjunction with the accompanying drawings, in which:

Figure 1 is a side view, partially in section and partially in elevation, of a furnace and steam generating mechanism with the dust collector apparatus of this invention associated therewith.

Fig. 2 is an enlarged fragmentary sectional view of a low draft loss dust collector, illustrating a further embodiment of the invention;

Fig. 3 is a view similar to Fig. 2, illustrating a still further embodiment of the invention;

Fig. 4 is a view similar to Fig. 3, illustrating a still further embodiment of the invention;

Fig. 5 is a view similar to Figs. 2–4 and illustrating a still further embodiment of the invention;

Fig. 6 is a view similar to Figs. 2–5, illustrating a still further embodiment of the invention; and Fig. 7 is a sectional view of the structure illustrated in Fig. 6, taken along the line 7—7 thereof.

Referring now to the drawings and more particularly to Fig. 1, it will be seen that a furnace 9 is provided, having a stoker 11 therein, which includes the usual apparatus 13, for supplying coal to a movable grate 15, on which the coal is burned. Air is supplied to aid in the burning of the coal, through suitable blower apparatus 17. The gas due to the burning of coal on the grate 15, flows upwardly in the furnace and a suitable boiler 19 is provided in the upper portion of the furnace, in which water is heated to steam. The boiler includes a plurality of coils or tubes and a super heater through which the water is circulated and heated to steam. The steam generated in the boiler flows out through a suitable conduit 21 to a steam operated turbine, or the like, for generating power.

The gases flowing through the furnace and past the boiler tubes flow downwardly into a breeching or a conduit 23, which, as illustrated in Fig. 1, is connected with the furnace adjacent the boiler tubes. The gases flowing through the furnace carry solid particles, some of which will be relatively large and others of which will be relatively small. The large particles are generally high in carbon content and are such as can be reburned in the furnace, while the small particles are low in carbon content and are primarily ash. The conduit or breeching 23 has one or more hoppers 25 connected with the underside thereof and extending throughout the length thereof. The conduit 23 also has an opening 27 in the side or outer wall 28 thereof, which extends laterally or horizontally and communicates with a dust collector 29, of any suitable type, which is adapted to efficiently remove all the particles from gases flowing upwardly therefrom through a suitable heat exchanger 31, which is connected in the system in a conventional and suitable manner. The collector 29 is generally of the type which is constructed to separate gas borne particles from the gases by centrifugal force and so is of the high draft loss or high pressure drop type. A suitable fan, or the like, may be connected with the upper end of the heat exchanger to pull the gases out through the system. The breeching or conduit 23 is constructed as will hereinafter apear, to form a low draft loss dust collector for removing the large, high carbon content particles from the gases, while the dust collector 29 removes the small particles from the gases and deposits them in hoppers 33, from which they can be removed by a suitable ash handling operation.

In order to remove the large particles from the gases in the low draft loss dust collector, without a large draft loss or pressure drop, the conduit 23 has a baffle member 35 therein extending angularly inwardly and downwardly from the side wall 28 thereof adjacent to and above the opening 27. Therefore, gases flowing downwardly into the conduit 23 from the furnace will be deflected by the baffle 35 toward the opposite wall 39 of the conduit 23, and will make a turn of approximately 180° in order to flow out through the opening 27. The gases cannot pass through hopper 25 so the only path of flow is through opening 27, and the baffle 35 makes the gases and gas borne particles turn more than 90° in order to flow out through the opening. A second baffle 41 projects from the wall 28 of the conduit 23 adjacent to the lower edge of the opening 27, so as to be in the path of flow of the gases as they flow toward the opening 27. The baffle 41 acts in effect as a skimmer, to engage the larger particles and deflect the same downwardly into the hopper 25. The baffle 41 is not, however, effective to separate the small particles from the gases and these particles will flow with the gases out through the opening 27. The large particles which fall into the hopper or hoppers 25 will be removed therefrom and blown back onto the stoker grate 15 by means of air flowing under pressure through a conduit 43, and through a conduit 45 on the lower end of the hopper 25, so that the particles wil be picked up in the air stream and will pass with the air stream through the conduit 43 and back into the furnace for reburning.

Thus, the gases flowing vertically down into the conduit 23 will turn more than 90° to pass through the opening 27, due to the baffle 35, and will turn approximately 180° so that the larger particles will either fall by gravity into the hoppers 25, or will be deflected by the skimmer baffle 41 into the hopper 25 for return to the stoker. It can be readily appreciated that there will be a very small pressure drop or draft loss in the dust collector formed in the conduit 23, and it will also be appreciated that while the dust collector 29 may be a relatively high draft loss collector, in order to be exceptionally efficient to remove all of the small particles from the gases, the low draft loss collector does not add materially to the power needed to pull the gases through the heat exchanger 31. Thus, the apparatus illustrated effectively separates the large particles from the gases for reburning in the furnace, without adding appreciably to the power consumption needed to pull the gases through the system, and the second dust collector 29 effectively removes all of the remaining particles from the gases, so that they can be handled in a suitable ash handling system. Thus, a more efficient operating unit is provided, in which coal consumption is at a minimum and in which power consumption is not adversely affected.

The low draft loss dust collector is shown in Fig. 1 as being disposed ahead of the high draft loss dust collector 29, and the heat exchanger 31, as well as in the breeching below the furnace and boiler. The collector, however, could be provided and formed in any gas duct and so arranged that the gas borne particles of solid material will be thrown out of the gas stream and into a hopper for return to the stoker.

The embodiment of the invention illustrated in Fig. 2 is quite similar to that illustrated in Fig. 1, in that the gases flow vertically down through the conduit 23' and the baffle 35' is provided to cause the gases to make more than a 90° turn as they pass vertically through the conduit 23 and out through the horizontal opening 27'. In this embodiment, the skimmer baffle 41' is also provided for causing the solid particles to be deposited in the hopper 25'. In addition to the baffles 35' and 41' an additional skimmer baffle 47 is attached to the baffle 35' at the upper or upstream end thereof, and this skimmer 47 skims off the gas borne particles as they concentrate on or engage the top of the baffle 35' and causes the particles to drop down through a tube 49 which is connected with skimmer 47 and has its lower end disposed in the hopper 25', so as to convey the solid particles to the hopper. With this arrangement solid particles engaging or concentrating on the baffle 35' will be conveyed to the hopper 25' through the tube 49, and the baffles 35' and 41' act in the same manner as previously described, to cause the gases to turn more than 90° before passing through the opening 27' so that the large particles will be separated from the gases. Thus, in this embodiment, an additional skimmer is provided to aid in separating the particles from the gas.

In the embodiment of the invention illustrated in Fig. 3, the construction of the low draft dust collector is quite similar to that previously described. However, in this embodiment a baffle 51 is connected with the wall 39'' of the conduit 23'' and is disposed above the baffle 35'' so as to positively force the gases adjacent the wall 39'' into engagement with the baffle 35'' so as to cause the particles to engage the top side of baffle 35''. The baffle 35'' acts as previously described to cause the gases and particles to flow again toward the wall 39". A plurality of vertically spaced skimmer baffles 53 are disposed adjacent to but spaced from the conduit wall 39", and these baffles 53 intercept the gas borne particles as the gas is deflected toward wall 39" as a result of engagement with the baffle 35". The gas borne particles intercepted by baffles 53 will drop between the baffles 53 and wall 39" into the hopper 25". Any large particles which are not so intercepted by the baffles 53 will be skimmed off and dropped into the hopper 25" by the baffle 41", as previously described.

The embodiment of the invention illustrated in Fig. 4 is substantially similar to that illustrated in Fig. 2, except that the baffle 51a is connected with the wall 39a above the baffle 35a, so as to direct the gases and particles flowing into the conduit onto the top of the baffle 35a, where the particles will be skimmed by baffle 47a and pass through tube 48a to the hopper 25a. Any gas borne particles which pass over the top of the skimmer 47a will engage the wall 39a and turn to come up toward the opening 27a so that they will be skimmed by the baffle 41a and dropped into the hopper 25a in the same manner as previously described.

In the embodiment of the invention illustrated in Fig. 5, the gases from the furnace or boiler outlet flow through a horizontal conduit portion 55, which terminates in the conduit portion 23b, comparable to that previously described. The baffle 35b is disposed above the opening 27b in the same manner as previously described, so as to cause the gas to turn substantially 180° in order to pass from the conduit 23b through the opening 27b. The baffle 41b is provided adjacent the lower side of the opening 27b so as to skim off large particles and drop them in the hopper 25b, in the manner previously described. The gases passing through the opening 27b will flow downwardly through an air heater or heat exchanger 31b, into conduit 23c adjacent the lower end thereof. Baffles 35c and 41c are provided adjacent a horizontally extending opening 27c, in the conduit in substantially the same manner as previously described. A hopper 25c is disposed below the baffle 41c, and the baffle 35c will cause the gases and gas borne particles to turn approximately 180° to pass through the opening 27c and the baffle 41c will skim off any particles which were not removed in the upper dust collector and drop them into the hopper 25c, in the same manner as previously described. In this embodiment, two low draft loss dust collectors are employed, one ahead of the heat exchanger and the other at the outlet of the heat exchanger, and ahead of the high draft loss dust collector which separates the small particles from the gas prior to the passage of the gases into the atmosphere or the like.

In the embodiments illustrated in Figs. 6 and 7, the construction of the low draft loss dust collector is identical to that described in connection with Fig. 1, except that the low draft loss dust collector is disposed below the heat exchanger 31d. Thus, the gases flowing downwardly through the heat exchanger 31d are deflected by the baffle 35d so as to make a substantially 180° turn and the gas borne particles will be skimmed from the gases by the skimmer baffle 41d, so as to fall into the hoppers 25d, while the gases will pass outwardly through the opening 27d into the atmosphere, or a subsequent dust collector.

Figs. 6 and 7 show the manner in which the several hoppers 25d are provided throughout the length of the conduit 23d, and also illustrate the manner in which the baffles 41d and 35d are supported by the breeching structure through the use of suitable braces 59 and by being connected directly to the wall 28d.

It will thus be seen that in all of the embodiments of this invention a low draft loss dust collector is provided ahead of the high draft loss and high efficiency dust collector, so that the large particles of gas borne solids, which are mostly carbon, will be separated from the gases ahead of the high draft loss dust collector, and can be returned to the furnace for reburning, while the smaller particles, which are mostly ash, will be taken out of the gas by the high draft loss dust collector and can be disposed of in the ash handling system. It will also be appreciated that these large particles are separated from the gases in all of the embodiments with the minimum amount of draft loss and are easily reclaimed for reburning. Thus, the baffle systems and constructions illustrated do an efficient job of removing the large particles which are to be reclaimed, without the loss of draft or excessive pressure drop, and aid materially in reducing fuel costs without materially increasing the power consumption required to pull the gases through the system.

It will, furthermore, be appreciated that one or more low draft loss dust collectors may be employed in the system, and that such dust collectors may be disposed immediately adjacent the boiler outlet, ahead of the heat exchanger or air heater, or may be disposed behind the heat exchanger so as to remove the particles from the gas after the gas has passed through the heat exchanger. In any event, the large particles are reclaimed in a simple manner, and a more efficient system is provided.

What is claimed is:

1. Apparatus for separating gas borne particles from gas, including an inlet conduit through which the gas may flow, a hopper disposed below said inlet conduit and having an inlet portion confronting and communicating with said inlet conduit so as to be capable of receiving the particles separated from the gas, an outlet conduit communicating with said inlet conduit above said hopper inlet portion, the longitudinal axes of said inlet conduit and said outlet conduit intersecting at substantially right angles, a first baffle element fixed to said inlet conduit at a position adjacent the top of said outlet conduit and extending generally toward the intersection of said axes so as to reduce the area of said inlet conduit, said first baffle element turning gas flowing through said inlet conduit angularly to the direction of the flow of gas through said inlet conduit at an increased velocity so that said gas and gas borne particles will turn through an angle more than ninety degrees in flowing through said inlet conduit and out through said outlet conduit, and a second baffle element fixed to said inlet conduit at a position adjacent the bottom of said outlet conduit and projecting inwardly toward the intersection of said axes, said second baffle projecting into the path of the turning gas and presenting a surface facing said hopper inlet portion for skimming gas borne particles from the gas prior to the passage of the gas through the outlet conduit, whereby said particles will fall downwardly into said hopper.

2. Apparatus for separating gas borne particles from gas, including an inlet conduit through which the gas flows, hopper means disposed below said inlet conduit and having an inlet portion confronting and communicating with said inlet conduit so as to be capable of receiving particles separated from the gas, an outlet conduit communicating with said inlet conduit above said hopper inlet portion, the longitudinal axes of said inlet conduit and said outlet conduit intersecting at substantially right angles, a first baffle element fixed to said inlet conduit at a position adjacent the top of said outlet conduit and extending generally toward the intersection of said axes so as to reduce the area of said inlet conduit, said first baffle element turning gas flowing through said inlet conduit angularly to the direction of the flow of gas through said inlet conduit at an increased velocity and causing said gas and gas borne particles to make more than a ninety degree turn when flowing out through said outlet conduit, additional conduit means connected with said first baffle element adjacent the inner end thereof and extending from said first baffle element into said hopper means so as to be capable of carrying gas borne particles into said hopper means, a second baffle element at the upper end of said additional conduit means and spaced inwardly from the inner end of said first baffle element for skimming off gas borne particles and causing the same to flow downwardly through said additional conduit means into said hopper means, and a third baffle element fixed to said inlet conduit at a position adjacent the bottom of said outlet conduit and projecting inwardly toward the intersection of said axes, said third baffle element projecting into the path of the turning gas and presenting a surface facing said hopper inlet portion for engaging gas and gas borne particles just prior to the flow of the gas through said outlet conduit so as to skim off gas borne particles, whereby the same will fall into said hopper means.

3. Apparatus for separating gas borne particles from gas, including an inlet conduit through which the gas flows, hopper means disposed below said inlet conduit and having an inlet portion confronting and communicating with said inlet conduit so as to be capable of receiving particles separated from the gas, an outlet conduit communicating with said inlet conduit above said hopper inlet portion, the longitudinal axes of said inlet conduit and said outlet conduit intersecting at substantially right angles, a first baffle element fixed to the wall of said inlet conduit which is opposite the entrance to said outlet conduit, said first baffle element projecting inwardly and downwardly from a position upwardly spaced from the top of said outlet conduit so as to turn gas flowing through said inlet conduit toward the entrance of said outlet conduit, a second baffle element fixed to said inlet conduit at a position adjacent the top of said outlet conduit and extending generally toward the intersection of said axes so as to reduce the area of said inlet conduit, said second baffle element turning gas flowing through said inlet conduit angularly toward said opposite inlet conduit wall at an increased velocity and causing said gas and gas borne particles to make more than a ninety degree turn when flowing out through said outlet conduit, a plurality of vertically spaced baffle elements adjacent to but spaced from said opposite inlet conduit wall and disposed laterally opposite the entrance to said outlet conduit so that gas borne particles flowing toward said opposite wall will be engaged thereby and will drop downwardly into said hopper means, and a third baffle element fixed to said inlet conduit at a position adjacent the bottom of said outlet conduit and projecting inwardly toward the intersection of said axes, said third baffle element projecting into the path of the turning gas and presenting a surface facing said hopper inlet portion for engaging gas and gas borne particles just prior to the flow of the gas through said outlet conduit so as to skim off gas borne particles, whereby the same will fall into said hopper means.

4. Apparatus for separating gas borne particles from gas, including a vertically extending inlet conduit through which the gas flows, hopper means disposed below said inlet conduit and having an inlet portion confronting and communicating with said inlet conduit so as to be capable of receiving particles separated from the gas, a horizontally extending outlet conduit communicating with said inlet conduit above said hopper inlet portion, the longitudinal axes of said inlet conduit and said outlet conduit being substantially co-planar and intersecting at substantially right angles, a first baffle fixed to said inlet conduit at a position adjacent the top of said outlet conduit and extending generally toward the intersection of said axes, said first baffle reducing the area of said inlet conduit so as to provide an orifice through which the gas flows thereby increasing the velocity of the gas and particles flowing past the first baffle and at the same time deflecting the gas and particles away from the outlet conduit at an angle to the direction of flow of gas through said inlet conduit, so that the gas borne particles will turn through an angle of more than ninety degrees when flowing through said inlet conduit and out through said outlet conduit at an increased velocity which will cause the larger particles to drop into said hopper means but permit the smaller particles to be carried with the gas through the outlet conduit, and a second baffle fixed to said inlet conduit adjacent the bottom of said outlet conduit and projecting inwardly toward the intersection of said axes, said second baffle projecting inwardly into the stream of the turning gas and presenting a surface facing said hopper inlet portion to cause particles to be deflected downwardly into said hopper means.

References Cited in the file of this patent

UNITED STATES PATENTS

| Number | Name | Date |
|---|---|---|
| 1,048,533 | Hoffman | Dec. 31, 1912 |
| 1,211,235 | Robertson | Jan. 2, 1917 |
| 1,382,100 | Lindstrom | June 21, 1921 |
| 1,562,352 | Lundquist | Nov. 17, 1925 |
| 2,047,568 | Lissman | July 14, 1936 |
| 2,051,924 | Watzke | Aug. 25, 1936 |
| 2,221,385 | Rogers | Nov. 12, 1940 |
| 2,263,433 | Allen | Nov. 18, 1941 |
| 2,343,895 | Frisch | Mar. 14, 1944 |